June 26, 1956  V. D. DRUMMOND ET AL  2,752,363
TWO STAGE OXIDATION OF OLEFINS USING A FLUIDIZED CATALYST
Filed Dec. 23, 1952  2 Sheets-Sheet 1

INVENTORS.
VIRGIL D. DRUMMOND
RAPHAEL KATZEN
MERLE L. GOULD
BY Leonard L. Kalish
ATTORNEY.

June 26, 1956  V. D. DRUMMOND ET AL  2,752,363
TWO STAGE OXIDATION OF OLEFINS USING A FLUIDIZED CATALYST
Filed Dec. 23, 1952  2 Sheets-Sheet 2

INVENTORS.
VIRGIL D. DRUMMOND
RAPHAEL KATZEN
BY MERLE L. GOULD
Leonard L. Kalish
ATTORNEY.

United States Patent Office 2,752,363
Patented June 26, 1956

2,752,363

TWO STAGE OXIDATION OF OLEFINS USING A FLUIDIZED CATALYST

Virgil D. Drummond, Southport, Conn., and Merle L. Gould and Raphael Katzen, Cincinnati, Ohio, assignors to The Vulcan Copper & Supply Co., Cincinnati, Ohio, a corporation of Ohio Application December 23, 1952, Serial No. 327,488

6 Claims. (Cl. 260—348.5)

This invention relates to a catalytic oxidation process and more particularly to the catalytic oxidation of gaseous olefins.

In the catalytic oxidation of olefins to olefin oxides, such as the oxidation of ethylene to ethylene oxide, it has been found necessary to retard the oxidation so as to avoid complete oxidation. This has heretofore been effected by the continuous addition of vaporous catalytic suppressors, sometimes referred to as anti-catalysts, to the reactants, in the catalytic oxidation reaction in order to regulate the degree of olefin oxidation. These catalytic suppressors apparently inhibit the oxidizing propensities of the oxidation catalyst so that the oxidation of the olefin to its ultimate oxidation products (consisting mainly of carbon dioxide and water) is retarded.

Heretofore some normally liquid chemical compounds having an appreciable volatility at the oxidative temperatures have been used for olefin oxidation to effect such catalyst suppression, as, for instance, in Law and Chitwood Patents 2,279,469 and 2,279,470 which issued on April 14, 1942. In the use of such volatile compounds it has been found necessary to continuously add the compounds to the catalytic oxidation reaction as the compounds are decomposed during the course of the catalytic oxidation or are removed with the catalytic oxidation products. Moreover, it has also been found necessary to closely regulate the addition within narrow limits. Thus, if too small a concentration of such catalytic suppressor is present, an undue amount of complete olefin oxidation to the ultimate olefin oxidation products will result with a concomitant decrease in the selective yield of olefin oxide. Conversely, if too large a concentration of catalytic suppressor is present, the activity of the oxidation catalyst is unduly inhibited with a resultant decrease in the over-all yield of olefin oxidation products including the olefin oxide. Since the catalytic suppression effect of these catalytic suppressors is a function of the conditions of temperature, reactant feed rate, diluent gas concentration and other process variables, as well as of the nature of the catalytic suppressor, this degree of regulation must be closely controlled. Thus, if during the course of the catalytic oxidation the process variables are altered, it is necessary to adjust the concentration of catalytic suppressor. In some cases, particularly in the case of normally liquid halogen-containing catalytic suppressors, where the deactivating effect produced upon the catalyst by the suppressor is of long duration, alteration of the process variables once the process is commenced is not feasible. Moreover, a particularly precise regulation of the rate of catalytic suppressor addition must be exercised in the case of the last-mentioned catalytic suppressors, since the deactivating effect produced on the oxidation catalyst by such suppressors may in some cases result in a permanent inhibition of the catalytic oxidation activity of the catalyst.

A measure of the close control necessary in the case of normally liquid halogen-containing catalytic suppressors may be gained from the fact that the continued use of but double the proper amount of these suppressors will reduce the production of catalytic oxidation product to practically nothing.

The use of solid anti-catalysts or catalytic suppressors has more recently been proposed. Thus, Sears Patent 2,615,900, issued October 28, 1952, discloses that certain metal halides are useful as catalytic suppressors for the oxidation of ethylene to ethylene oxide.

However, no process has heretofore been developed which furnishes high yields of olefin oxide, without an appreciable build-up of by-product gases and/or explosive mixtures.

This invention has as an object the provision of an efficient catalytic process for the oxidation of an olefin to olefin oxide.

This invention has as a further object the provision of a facile method for the catalytic oxidation of ethylene to ethylene oxide.

This invention has as a still further object the provision of a catalytic oxidation process in which the close degree of continuous regulation attendant to catalytic oxidation processes utilizing a normally liquid catalytic suppressor is avoided.

This invention has as a different object the provision of a method for the catalytic oxidation of olefins in which the continuous addition of a catalytic suppressor is not necessary.

This invention has as a further object the provision of a method for the catalytic oxidation of olefins in which the process variables can be rapidly altered.

This invention has as a different object the provision of a method for the catalytic oxidation of olefins in which a high yield of olefin oxide can be secured.

This invention has as a still further object the provision of a continuous method for the catalytic oxidation of olefins in which the build-up of gaseous by-products and explosive mixtures is prevented.

These and other objects are accomplished by the process of our invention which comprises a continuous catalytic oxidation process in which a feed of gaseous charge comprising an olefin and molecular oxygen is passed upwardly at a temperature of between about 100 to 400° C. (preferably 175 to 300° C.) through a first fluidized bed of particles comprising an oxidative catalytic component, an inert filler component and an inorganic halide component to form an effluent comprising an olefin oxide. It is essential for the purposes of our invention that the aforementioned inorganic halide component comprise a solid at said temperature and not undergo substantial chemical transformation on contact with the gaseous charge at said temperature. The effluent from the aforementioned first bed of particles is cooled and the olefin oxide withdrawn. The remainder of the effluent is divided into major and minor portions, and the major portion of the remainder of the effluent, which must comprise an amount equalling between about 70 to 90 percent by weight of the feed introduced to said first fluidized bed, preferably about 80 percent, plus additional gaseous charge in amount sufficient to complete the feed is recycled through the first bed of particles at a temperature of between about 100 to 400° C. to form an effluent containing an olefin oxide. Additional molecular oxygen is added to the minor portion of the remainder of the effluent from the first bed of particles, preferably in an amount sufficient to equal the oxygen concentration in the feed to said first fluidized dense phase bed. This mixture is transferred through a second fluidized bed of particles comprising an oxidative catalytic component, an inert filler component and an inorganic halide component, said inorganic halide component being a solid at the aforementioned temperature and not undergoing substantial chemical transformation on contact with the gaseous charge at said temperature, to form an effluent containing olefin oxide.

Each of the aforementioned beds should comprise a fluid bed of particles, and preferably a fluidized captive dense-phase bed of particles, such as described in U. S. application for Letters Patent Serial No. 319,376, filed November 7, 1952.

A variety of solid oxidative catalytic components can be employed in the process of our invention. We make no claim to a novel oxidative catalytic component, per se, and accordingly any oxidative catalyst for the catalytic oxidation of olefins, which is a solid under the oxidizing conditions, can be used as the oxidative catalytic component in the process of our invention. However, particularly useful oxidative catalytic components comprise the active elemental silver oxidation catalysts, or silver compounds which are chemically transformed on contact with the gaseous charge at the oxidizing conditions to elemental silver, such as silver oxide.

A wide variety of inert filler components can be utilized in the process of our invention. In fact, any material which is a solid and non-catalytic under the oxidizing conditions can serve this purpose. Examples of particularly useful materials include alumina, silica, silicon carbide, magnesia, etc. If desired, the filler may be composited with the remaining components, or may be in the form of discrete particles.

The inorganic halide component utilized in the process of our invention must be a solid at the oxidation reaction temperature and must not undergo substantial chemical transformation on contact with the gaseous charge at the oxidative temperature. By "substantial chemical transformation" is meant a relatively rapid conversion to another chemical substance, such as the rapid conversion of the halide to the oxide, or to the elemental form of the cation. In particular, the alkali metal halides are to be preferred for use in the process of our invention especially the chlorides and fluorides of potassium and sodium. We especially prefer the use of potassium chloride as the inorganic halide component.

It is most advantageous to add the inorganic halide component, particularly in the case of alkali metal fluorides and chlorides, in small incremental amounts and to maintain the concentration of the inorganic halide component below 5 weight percent of the oxidative catalytic component, and most preferably below 1.0 weight percent. It is advantageous to add the inorganic halide component to the oxidative catalytic component and inert filler component when the latter are at an elevated temperature, such as between 100 to 400° C. Minor incremental amounts of inorganic halide component are added at intervals of time, such as at periods of a week or more during the on-stream processing period.

The following is illustrative of the relative proportions of the components which can be utilized in accordance with the process of our invention, it being understood, of course, that these proportions may be varied.

Table

| Silver, Wt. Percent | Inert Particles, Wt. Percent | Potassium Chloride, Wt. Percent |
|---|---|---|
| 29.97 | 70.0 | 0.03 |
| 29.70 | 70.0 | 0.30 |
| 19.97 | 80.0 | 0.03 |

While the particles used in the process of our invention may be disposed in any of the conventional forms of fluidized beds, a fluidized captive bed of particles is to be preferred. By "fluidized captive bed of particles," we mean a fluid bed which forms a self-contained entity and from which particles are not withdrawn for the purposes of regeneration or for other purposes and to which particles are not added, except as heretofore indicated, at intervals of time.

In a preferred embodiment of the process of our invention ethylene is oxidized to ethylene oxide although, of course, any olefin that is a gas at the oxidizing conditions can be use in the process of our invention. Any source of molecular oxygen can be used, although due to its cheapness, the use of air is preferred. Any of the conventional ratios of olefin to molecular oxygen can be used. While any conventional oxidative temperature such as an oxidative temperature of between about 100 to 400° C. can be used, a temperature of between about 175 to 300° C. is preferred, especially in the case of the oxidation of ethylene. Moreover, as a general rule, the higher the concentration of the inorganic halide component, the higher should be the temperature within the aforementioned temperature range. Conventional pressures heretofore employed for the catalytic oxidation of olefins can be used, such as from about atmospheric pressure to about 200 pounds per square inch. A pressure in the range 100 to 150 pounds per square inch is to be preferred.

For a better understanding of the process of our invention reference should be had to the accompanying figures which are hereby incorporated into our application and made a part thereof.

Figure 1:
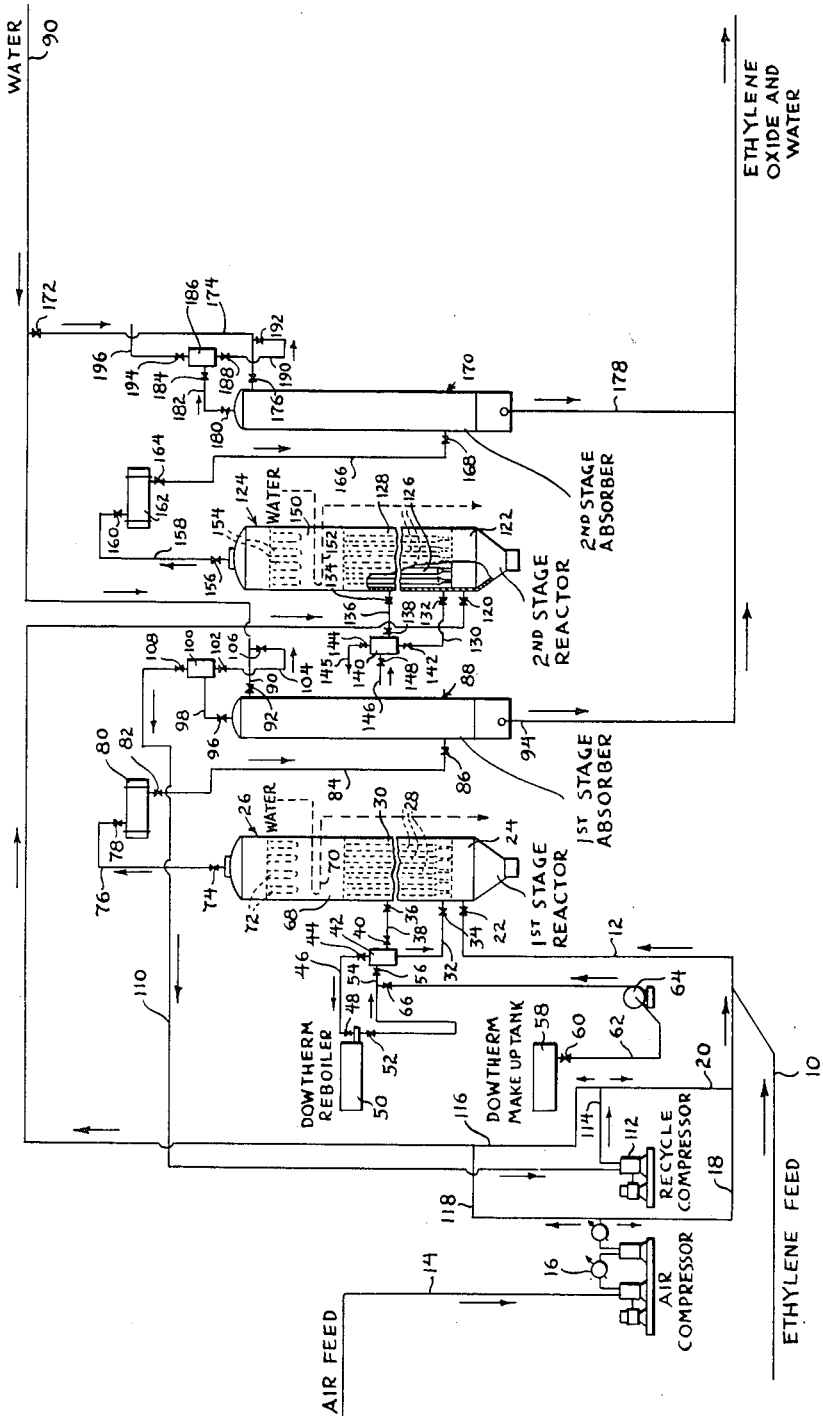
Figure 1 is a diagrammatic representation of a continuous system incorporating the process of our invention.

Referring to Figure 1, ethylene is introduced into the system through line 10 and passed to line 12. In line 12 the ethylene is joined by compressed air which is introduced into the system through line 14, air compressor 16 and line 18 which terminates in line 12. A minor portion of the air is directed from line 18 through line 118. The mixture of ethylene and air in line 12 is joined by recycle from line 20 to form the feed. Due to the heating of the air by compression in air compressor 16 the mixture in line 12 is at a temperature of about 60° C. and is under a pressure of 125 pounds per square inch gage. If desired, a pre-heater (not shown) can be used to bring the mixture in line 12 to this temperature.

The mixture in line 12 is passed through valve 22 into the lower manifold chamber 24 of reactor 26. From the lower manifold chamber 24 of reactor 26, the gases pass upwardly through a plurality of open cylindrical catalytic tubes designated 28 which are vertically disposed in median chamber 30 of reactor 26. A heat-exchange medium, such as Dowtherm, is introduced into median chamber 30 through line 32 and valve 34 to regulate the temperature within the open cylindrical catalytic tubes 28, as will be explained below. The mixture from lower manifold chamber 24 passes upwardly at an initial linear gas velocity of the order of one-half to two feet per second through the open cylindrical catalytic tubes 28.

Figure 2:
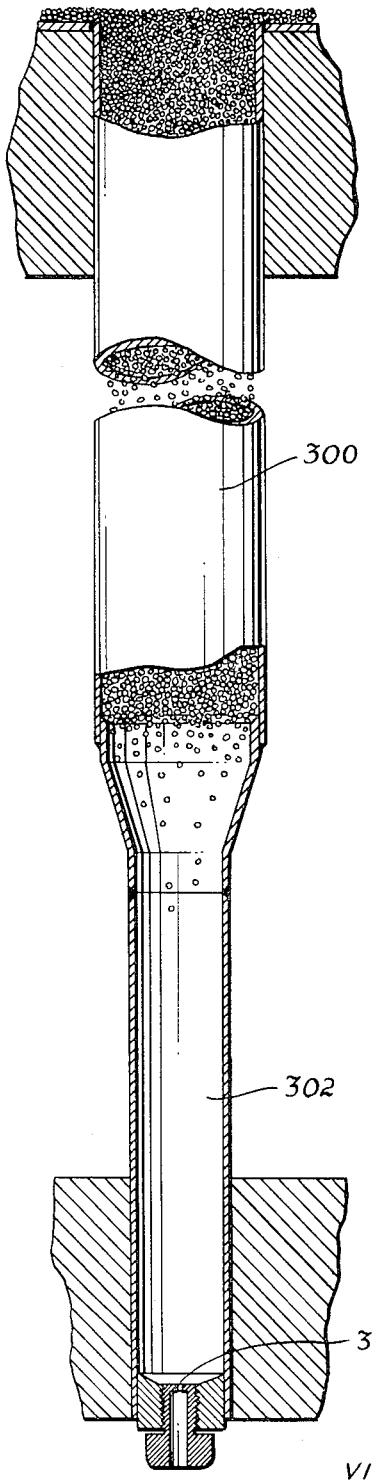
Figure 2 is a sectional view of an upright open catalytic tube employed in the catalytic reactors used in the process of our invention.

Referring to Figure 2 which is a sectional view of one of open cylindrical catalytic tubes 28, it is seen that open cylindrical catalytic tube 28 comprises a main body 300, a basal portion comprising calming-section 302 of relatively smaller cross-sectional area and a terminal orifice 304 of a much smaller cross-sectional area.

The gaseous charge of ethylene and air entering open cylindrical catalytic tube 28 passes upwardly at a high velocity through orifice 304 into calming-section 302 wherein the turbulence is eliminated and the velocity reduced to a velocity sufficient for the gaseous charge to maintain a fluidized captive dense phase bed of particles in the main body 300 of open cylindrical catalytic tube 28 and a fluidized dense phase equalizer bed of particles above the open cylindrical catalytic tubes which join the fluid beds in each of the open cylindrical catalytic tubes. In the instant case, the particles comprise discrete particles of elemental silver, alumina and potassium chloride, each particle being of sufficiently small size to pass through an 80 mesh Tyler screen. The potassium chloride particles were added to the bed of particles after the elemental silver and alumina had been brought to reaction temperature.

The catalytic oxidation of the ethylene to ethylene oxide is effected by the contact of the feed mixture with the fluidized captive dense phase bed within open cylindrical catalytic tubes 28 as the feed mixture passes upwardly therethrough.

The catalytic oxidation is highly exothermic, and accordingly the temperature within open cylindrical catalytic tubes 28 must be regulated to prevent excessive heating of the ethylene and its undesirable decomposition to carbonaceous contaminant and/or carbon dioxide. The regulation of temperature is effected by the passage of Dowtherm through median chamber 30 at a rate sufficient to maintain a temperature of the effluent from open cylindrical catalytic tubes 28 at a temperature below about 265° C. The heated Dowtherm is removed from median chamber 30 by means of valve 36, line 38 and valve 40 and is passed to vapor-liquid separator 42. The vapors from vapor-liquid separator 42 are removed overhead through valve 44, line 46 and valve 48 to reboiler 50. In reboiler 50 the heated Dowtherm is heat-exchanged with water to produce steam. The cooled Dowtherm is returned to vapor-liquid separator 40 by means of valve 52, line 54 and valve 56. Additional Dowtherm may be added when needed to the Dowtherm system from vessel 58, valve 60, line 62, pump 64 and valve 66.

The effluent from open cylindrical catalytic tubes 28 passes through upper manifold chamber 68 wherein it is cooled by heat-exchange contact with cold water pipes 70. The effluent which as heretofore indicated, was at a temperature of about 265° C. is cooled to a temperature of about 150° C. by this contact. Cooled effluent is then passed through a series of porous filters 72 which are vertically disposed in upper manifold chamber 68 and serve to filter out any entrained particles contained in the effluent. Porous filters 72 have been pre-coated with a layer of alumina particles which is retained on the surface of the filters by the passage of the effluent gas therethrough. The thickness of the coating of alumina particles upon porous filters 72 is regulated so that entrained catalyst particles carried to porous filters 72 contact with porous filters 72 but fall away therefrom due to the force of gravity back into upper manifold chamber 68. In this manner, silver oxidation catalyst particles from the fluidized captive beds in open cylindrical catalytic tubes 28 are prevented from remaining in contact with porous filters 72.

The filtered effluent passes out of upper manifold chamber 68 through valve 74, line 76 and valve 78 to cooler 80. In cooler 80 the temperature of the effluent is reduced by heat-exchange with cold water pipes to a temperature of about 40° C. The cooled effluent is removed from cooler 80 and passed through valve 82, line 84 and valve 86 into primary absorber 88.

In primary absorber 88 the ethylene oxide is removed by counter-current scrubbing with water which is introduced into primary absorber 88 at a temperature of 10° C. through line 90 and valve 92. The water and absorbed ethylene oxide is withdrawn from the base of primary absorber 88 by means of line 94. The scrubbed effluent is removed from the top of primary absorber 88 through valve 96 and line 98. Entrained water is separated from the effluent by primary knock-down drum 100 and is removed through valve 102, line 104 and valve 106 from which it is sent to line 90.

The washed effluent remainder is removed as overhead from primary knock-down drum 100 and is passed through valve 108 and line 110 to recycle compressor 112 wherein it is repressurized to the pressure found within line 12, namely 125 lbs. per square inch gauge. The pressurized effluent remainder is removed from recycle compressor 112 through line 114 and a major portion diverted to line 12 by means of line 20 as heretofore indicated. It is essential for the purposes of our invention that the major portion of the effluent remainder diverted to line 12 equal about 70 to 90 per cent by weight of the feed introduced to said first fluidized dense phase bed.

The minor remaining portion of the compressed effluent remainder from line 114 is passed to line 116 wherein it is joined by air in sufficient amount to equal the oxygen concentration in the feed to the first fluidized dense phase bed from air compressor 16 and line 118. The combined mixture is passed through line 116 and valve 120 into lower manifold chamber 122 of reactor 124. Reactor 124 is identical to reactor 26 except that inasmuch as smaller amounts of feed are being passed through reactor 124 per unit time it is smaller in size. The charge comprising the effluent remainder and air is passed upwardly from lower manifold chamber 122 through open cylindrical catalytic tubes 126 vertically disposed in median chamber 128 of reactor 124. Each of open cylindrical catalytic tubes 126 contains a fluidized captive dense phase bed of particles identical to the fluidized captive beds heretofore described as being contained in catalytic tubes 28. The temperature within open catalytic tubes 126 is maintained at an identical level as that within open catalytic tubes 28.

The aforementioned maintenance of temperature control is effected by introducing Dowtherm from line 130 and valve 132 into median chamber 128 wherein heat-transfer is effected with the catalytic tubes 126. The heated Dowtherm is withdrawn from median chamber 128 through valve 134, line 136 and valve 138 and is passed to vapor-liquid separator 140. Liquid Dowtherm is withdrawn from the bottom of vapor-liquid separator 140 through valve 142 and line 130. Vaporized Dowtherm is withdrawn overhead from vapor-liquid separator 140 through valve 144 and line 145 from which it is passed to reboiler 50 (by means not shown). Cooled Dowtherm from reboiler 50 is passed to line 146 (by means not shown) and valve 148 into vapor liquid separator 140.

The heated effluent from open cylindrical catalytic tubes 126 passes to upper manifold chamber 150 and is cooled by heat-exchange contact with cold water tubes 152. Cooling of the effluent to a temperature of about 150° C. is effected by the contact with cold water tubes 152.

The cooled effluent is passed through filters 154 which are coated with alumina particles to the same extent as previously set forth in the description of filters 72, and the deposition of silver particles on filters 154 is prevented in the same manner as heretofore set forth for filters 72. The filtered effluent passes from filters 154 through valve 156, line 158 and valve 160 into cooler 162. The effluent is cooled in cooler 162 to a temperature of about 40° C., and the cooled effluent then passes from cooler 162 through valve 164, line 166 and valve 168 into absorber 170.

In absorber 170 the ethylene oxide content of the effluent is removed by countercurrent scrubbing with water which is introduced into scrubber 170 from line 90, valve 172, line 174 and valve 176. The ethylene oxide and water is withdrawn from absorber 170 by line 178 and is then passed to line 94 wherein it joins the mixture of ethylene oxide and water from absorber 88.

The overhead from absorber 170 is removed through valve 180, line 182 and valve 184 and is passed to reservoir 186. Entrained water is removed from reservoir 186 by valve 188, line 190 and valve 192 and passed to line 174. The overhead from knock-down drum 186 is passed through valve 194, line 196 and can be vented, or if desired, passed through a gas recovery unit and the useful gas components separated and recovered.

When the degree of recycling is controlled within the limits heretofore indicated, the build-up of undesirable gaseous by-products such as carbon dioxide to predetermined limits such as, for example, to 5 to 7%, is controlled, and the formation of explosive mixtures is prevented. Adjustment and regulation of the degree of recycling in any given case within the aforementioned limits is a function of the composition of the gaseous charge, the process variables and the nature and type of the catalyst bed, as well as the desired limits for the build-up of gaseous by-products.

The process of our invention permits high yields of olefin oxides to be obtained from the oxidation of olefins, while at the same time the build-up of undesirable gaseous by-products such as carbon dioxide can be prevented. Moreover, the close degree of continuous regulation heretofore required in catalytic oxidation processes such as those employing a liquid catalyst suppressor is obviated, since it is not necessary to continuously add catalytic suppressor to the catalytic oxidation process of our invention. Furthermore, the process of our invention permits a close control of the process variables such as the oxidation temperature while at the same time permitting the process variables to be altered rapidly.

The present invention may be embodied in other specific forms without departing from the spirit or essential attributes thereof, and it is therefore desired that the present embodiment be considered in all respects as illustrative and not restrictive, reference being had to the appended claims rather than to the foregoing description to indicate the scope of the invention.

Having thus described our invention, we claim as new and desire to protect by Letters Patent:

1. A catalytic oxidation process which comprises continuously passing a feed of gaseous charge comprising an olefin and molecular oxygen upwardly at a temperature of between about 100 to 400° C. through a first fluidized dense phase bed of particles comprising discrete particles of an inorganic metal halide compound which is a solid at said temperature and does not undergo substantial chemical transformation on contact with the gaseous charge at said temperature, discrete particles of a silver oxidative catalytic component selected from the group consisting of elemental silver particles and particles of a silver compound which is transformed into elemental silver on contact with an olefin and molecular oxygen at a temperature of about 100 to 400° C., and discrete particles of an inert filler component, to form an effluent comprising an olefin oxide, cooling said effluent, withdrawing olefin oxide from said effluent, dividing the remainder of said effluent into major and minor portions, said major portion equalling between about 70 to 90 per cent by weight of the feed introduced to said first fluidized dense phase bed, recycling said major portion of the remainder of said effluent plus additional gaseous charge sufficient to complete said feed through said first fluidized dense phase bed of particles at a temperature of between about 100 to 400° C. to form additional olefin oxide, transferring the minor portion of the remainder of said effluent plus additional molecular oxygen upwardly at a temperature of between about 100 to 400° C. through a second fluidized dense phase bed of particles comprising discrete particles of an inorganic metal halide compound which is a solid at said temperature and does not undergo substantial chemical transformation on contact with the gaseous charge at said temperature, discrete particles of a silver oxidative catalytic component selected from the group consisting of elemental silver particles and particles of a silver compound which is transformed into elemental silver on contact with an olefin and molecular oxygen at a temperature of about 100 to 400° C., and discrete particles of an inert filler component, to form an effluent comprising an olefin oxide.

2. A catalytic oxidation process which comprises continuously passing a feed of ethylene and air upwardly at a temperature of between about 175 to 300° C. through a first fluidized dense phase bed of particles comprising discrete particles of an inorganic halide compound which is a solid at said temperature and does not undergo substantial chemical transformation on contact with the ethylene and air at said temperature, discrete particles of a silver oxidative catalytic component selected from the group consisting of elemental silver particles and particles of a silver compound which is transformed into elemental silver on contact with an olefin and molecular oxygen at a temperature of about 100 to 400° C., and discrete particles of an inert filler component, to form an effluent comprising ethylene oxide, cooling said effluent, withdrawing ethylene oxide from said effluent, dividing the remainder of said effluent into major and minor portions, said major portion equalling between about 70 to 90 per cent by weight of the feed introduced to said first fluidized dense phase bed, recycling said major portion of the remainder of said effluent plus additional ethylene and air sufficient to complete said feed, through said first fluidized dense phase bed of particles at a temperature of between 175 to 300° C. to form additional ethylene oxide, transferring the minor portion of the remainder of said effluent plus additional air upwardly at a temperature of between about 175 to 300° C. through a second fluidized dense phase bed of particles comprising discrete particles of a silver oxidative catalytic component selected from the group consisting of elemental silver particles and particles of a silver compound which is transformed into elemental silver on contact with an olefin and molecular oxygen at a temperature of about 100 to 400° C., discrete particles of an inert filler component and discrete particles of an inorganic halide compound which is a solid at said temperature and does not undergo substantial chemical transformation on contact with the gaseous charge at said temperature, to form an effluent comprising ethylene oxide.

3. A process in accordance with claim 1 in which the inorganic metal halide component in each bed is present to the extent of 0.01 to 5.0 weight per cent of the weight of the silver oxidative catalytic component.

4. A process in accordance with claim 1 in which the metal halide component is selected from the group consisting of potassium chloride, potassium fluoride, sodium chloride and sodium fluoride.

5. A process in accordance with claim 4 in which at least one of said fluidized beds comprises a bed containing discrete particles of potassium chloride.

6. A process in accordance with claim 4 in which the major portion of the remainder of the effluent from the first fluidized dense phase bed equals about 80 per cent by weight of the gaseous feed.

References Cited in the file of this patent

UNITED STATES PATENTS

| | | |
|---|---|---|
| 2,430,443 | Becker | Nov. 11, 1947 |
| 2,458,266 | Heider | Jan. 4, 1949 |
| 2,600,444 | Sullivan | June 17, 1952 |
| 2,615,900 | Sears | Oct. 28, 1952 |
| 2,622,088 | Thomas | Dec. 16, 1952 |
| 2,628,965 | Sullivan | Feb. 17, 1953 |
| 2,693,474 | Egbert | Nov. 2, 1954 |